March 3, 1942.   E. J. PARDON   2,275,035
ROLLER SKATE CONSTRUCTION
Filed Feb. 17, 1940
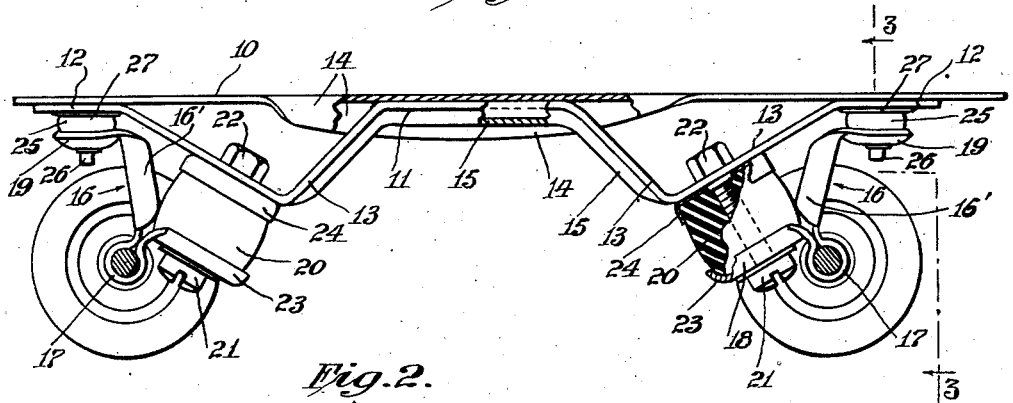
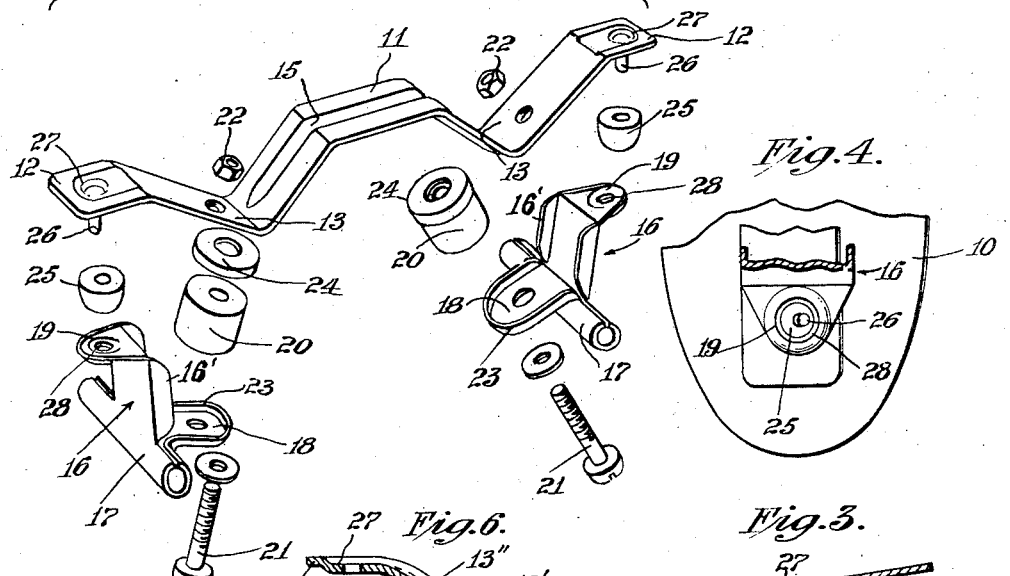
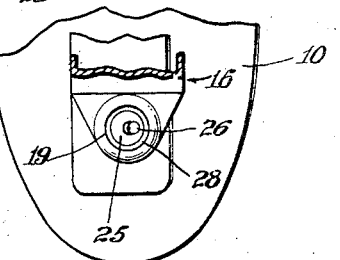
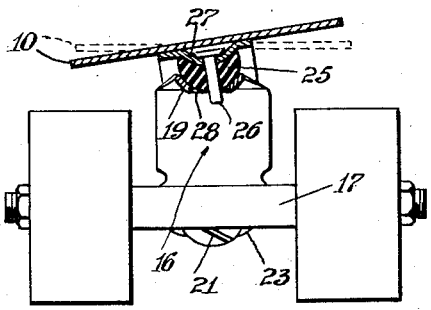
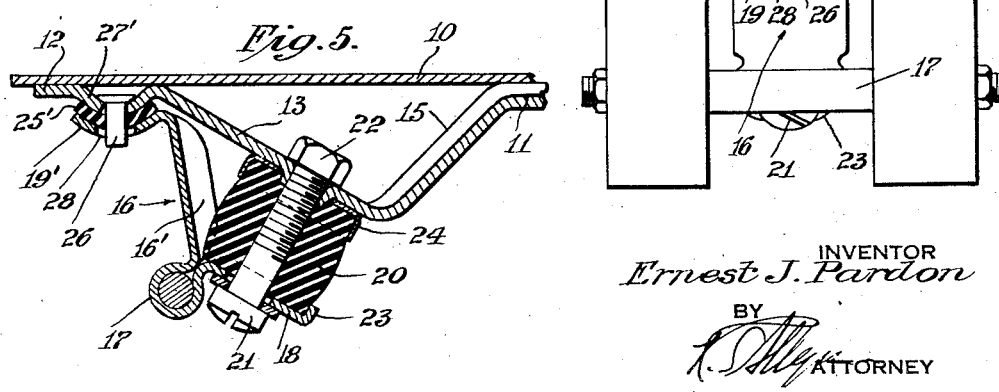
INVENTOR
Ernest J. Pardon
BY
ATTORNEY Patented Mar. 3, 1942

2,275,035

UNITED STATES PATENT OFFICE 2,275,035

ROLLER SKATE CONSTRUCTION

Ernest J. Pardon, Torrington, Conn., assignor to Union Hardware Company, Torrington, Conn., a corporation of Connecticut Application February 17, 1940, Serial No. 319,392

5 Claims. (Cl. 280—11.28)

This invention relates to roller skate constructions.

One object of my invention is to provide a strong but simple construction.

Another object is to provide a construction especially adapted to rink skating.

Another object is to provide a skate in which the foot plate is so mounted with respect to the wheel or roller trucks that it can readily tilt and swivel so as to permit sharp turns.

Another object is to provide a construction which can be made as economically and effectively as possible.

In its preferred form the skate frame is formed of a foot plate and a sub-frame member having two offset spaced truss-like portions. A two-armed roller truck is secured by a single clamp bolt to the frame offset so that it can tilt and swivel with respect to the frame. A thick rubber washer is interposed between one arm and the frame and a hemi-spherical member preferably resilient is swiveled between the other arm and the frame.

Fig. 1 is a side view of a skate embodying one form of my invention, the wheel or roller shafts being shown in section.

Fig. 2 is an exploded perspective view showing the various parts of the construction.

Fig. 3 is a sectional view taken on the plane of the line 3—3 of Fig. 1 with the foot plate shown tilted.

Fig. 4 is a detail view showing the underside of one end of the frame with the truck guide.

Fig. 5 is a sectional and side view of one end of a slightly modified connection for the truck and frame.

Fig. 6 is a longitudinal section of a modification of one of the truck supporting ends of the sub-frame member.

The frame consists of a foot plate 10 and a sub-frame member 11, both made of sheet metal and preferably welded together at the center and at the front and rear ends 12, 12 so as to form a very strong but light construction. Between the center and the ends, the sub-frame has depressed or offset truss-like portions 13, 13 to which the trucks are connected. The sides of the plate 10 may be flanged at 14 to reinforce it. The sub-frame is also preferably reinforced by ribs 15.

Each truck 16 has a tubular portion 17 forming a bearing for a roller or wheel shaft, and its flaring arms terminate in sockets 18 and 19. A thick resilient rubber washer 20 is interposed between the lower socket 18 and the adjacent offset 13 and a clamp bolt 21 passes through this washer and compresses it between parts 18 and 13. For this purpose the bolt may pass freely through one part and have a screw threaded connection with the other. A lock nut 22 is also preferably provided. I also prefer to provide confining cup-like members 23 and 24 to prevent the ends of the washer 20 from spreading when it is compressed.

A second washer 25 of soft rubber somewhat semi-spherical in form is preferably interposed between the end of the frame and the upper socket 19 of the truck. A guide pin member 26 is fixed, for instance by riveting, to the boss 27 of the end of the frame member and extends downwardly through the opening 28 in the socket 19. This opening 28 is made considerably larger than the guide pin so as to permit the foot plate and the attached pin to tilt and swivel with respect to the truck and attached wheels.

Each truck may be provided with flanges or ribs such as 16' in order to reinforce it.

A modified form of connection is shown in Fig. 5 where the boss 27' is hemi-spherical and the socket 19' is similarly shaped. A soft rubber washer 25' may be interposed and shaped into cup-like form by the pressure between the parts.

The sub-frame may be provided with an upturned screw seat 13' for the screw bolt 21 as shown in the form illustrated in Fig. 6. The edge 13" of the offset portion of the sub-frame may be flanged or arched to reinforce the support.

It will be understood that the truck members are preferably of sheet metal which may be suitably ribbed if desired for stiffening but which will be somewhat resilient.

The clamp screw or bolt 21 serves as the sole device for connection of each truck to the frame and this bolt serves to compress both washers 20 and 25 so that the frame is resiliently supported at two points on each truck and each truck is capable of tilting.

The construction is therefor especially adapted to rink skating where great flexibility is desired.

Among the advantages of this invention may be mentioned the fact that the rotation of the truck may occur about an axis intermediate the ends of the truck, due to the clearance in the connection at each end of the truck and also due to the yieldability in each connection. For a given linear displacement of the rubber, greater angular displacement may result when the axis of rotation is intermediate the ends, rather than at one end, since the radius is a maximum when the axis is at one end of the truck. On tightening the bolt there need be no change in the clearance in the connections for either arm of the truck because both cushions may be simultaneously compressed.

I claim:

1. The combination with a roller skate body portion having a foot plate and a sub-frame, of a truck having two arms, a resilient cushion located between the sub-frame and one arm of the truck, an adjustable bolt passing through said cushion for securing said truck to the sub-frame with limited clearance between the bolt and truck arm, another resilient cushion of less depth than the first cushion and located between the other truck arm and said body portion, a pin rigidly secured to said body portion and passing through said second cushion and its arm, each arm being dished for reception of its cushion, the axes of said cushions forming an acute angle to each other whereby on tightening said bolt both cushions are simultaneously compressed.

2. The combination with a roller skate body portion having a foot plate and a sub-frame, of a truck having two arms, a resilient cushion located between the sub-frame and one arm of the truck, an adjustable screw bolt passing through said cushion and into said frame for securing said truck to the sub-frame with limited clearance between the bolt and truck arm, a hemi-spherical resilient cushion located between the other truck arm and said body portion, a pin rigidly secured to said body portion and passing through said second cushion and its arm, each arm being dished for reception of its cushion, the axes of said bolt and said pin forming an acute angle to each other whereby on tightening said bolt both cushions are simultaneously compressed.

3. A roller skate comprising a foot plate, an integral sub-frame secured to the foot plate, stamped metal trucks each having two arms and forming a housing for an axle, a resilient cushion located between each truck arm and the sub-frame, an inclined clamping bolt extending loosely through one arm of each truck for securing the truck to the sub-frame and for adjustably clamping both cushions, a pin extending through each cushion through which a clamping bolt does not pass, there being sufficient clearance around the clamping bolts and pins for each of the trucks to swivel about an axis intermediate its pin and bolt.

4. A roller skate truck comprising a piece of sheet metal bent to provide an axle housing and arms diverging from said housing, the end portion of each arm being perforated and dished around said perforation, the arms being of unequal length and the shorter arm having a dished portion of larger diameter than the longer arm, the dished portion of the longer arm extending at an acute angle to the plane of the main part of said longer arm and said longer arm being provided with bent flanges located between said housing and dished portion.

5. The combination with a roller skate body portion having a foot plate and a truck having an axle and two perforated arms extending respectively in front of and to the rear of the truck axle, a resilient cushion located between the foot plate and one arm of the truck, a clamping bolt passing through said arm and its cushion and securing said truck to the foot plate with limited clearance between the bolt and truck arm whereby said arm may have both lateral and tilting movement with respect to the foot-plate and adjacent the bolt, another resilient cushion located between the other truck arm and said foot plate, a pin secured to the foot plate and passing through said second cushion and the perforation in its arm, the perforation in said second arm being sufficiently larger than the diameter of the pin to permit limited lateral movement of the arm with respect to and adjacent the pin, the axes of said bolt and pin forming an acute angle to each other whereby on tightening said bolt both cushions may be simultaneously compressed.

ERNEST J. PARDON.